3,047,591
PREPARATION OF 17α-ACYLOXY-6α-METHYL-16-METHYLENEPREGN-4-ENE-3,20-DIONES

Vladimir Petrow and David Morton Williamson, London, England, assignors to The British Drug Houses Limited
No Drawing. Filed Aug. 25, 1960, Ser. No. 51,801
Claims priority, application Great Britain Aug. 31, 1959
6 Claims. (Cl. 260—397.4)

This invention is for improvements in or relating to the preparation of organic compounds and has particular reference to the preparation of compounds originally believed to be 17α-acyloxy-6α,16-dimethylpregn-4-ene-3,20-diones but now believed to be 17α-acyloxy-6α-methyl-16-methylenepregn-4-ene-3,20-diones having the general Formula I below.

Our co-pending application No. 829,234 describes a process for the preparation of a hydroxy dione originally believed to be 17α-hydroxy-6α,16-dimethylpregn-4-ene-3,20-dione but now believed to be 17α-hydroxy-6α-methyl-16-methylenepregn-4-ene-3,20-dione which process comprises oxidising 3β-hydroxy-6,16-dimethylpregna-5,16-dien-20-one by the Oppenauer procedure to give 6α,16-dimethylpregna-4,16-diene-3,20-dione, reacting the 6α,16-dimethylpregna-4,16-diene-3,20-dione with alkaline hydrogen peroxide to give the corresponding 16,17-epoxide, treating the epoxide with a hydrogen halide and submitting the resultant product to treatment with Raney nickel. The resulting compound, originally believed to be 17α-hydroxy-6α,16-dimethylpregn-4-ene-3,20-dione but now believed to be 17α-hydroxy-6α-methyl-16-methylenepregn-4-ene-3,20-dione, may be acylated to give a product originally believed to be 17α-acyloxy-6α,16-dimethylpregn-4-ene-3,20-dione, but now believed to be 17α-acyloxy-6α-methyl-16-methylenepregn-4-ene-3,20-dione having the formula

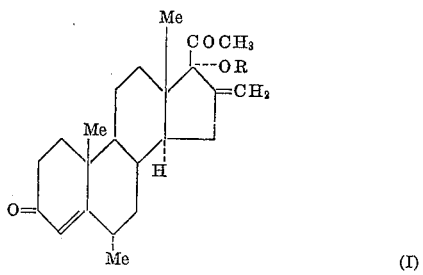

(I)

where R is a carboxylic acid residue containing up to 10 carbon atoms for reasons which have been fully described in our co-pending application No. 829,234. It is further shown in our co-pending application No. 829,234 that 17α-acyloxy-6α-methyl - 16 - methylenepregn-4-ene-3,20-diones (I; where R has the same meaning as above) represent a novel family of progestational agents of exceptional potency.

It is an object of the present invention to provide a new process for the preparation of the compounds originally belived to be 17α-acyloxy-6α,16-dimethylpregn-4-ene-3,20-diones but now believed to be 17α-acyloxy-6α-methyl-16-methylenepregn-4-ene-3,20-diones having the general formula I above where R is a carboxylic acid residue containing up to 10 carbons, which are of value on account of their progestational properties.

According to the present invention there is provided a process for the preparation of 17α-acyloxy-6α-methyl-16-methylenepregn-4-ene-3,20-diones having the general Formula I above, wherein R is a carboxylic acid residue containing not more than 10 carbon atoms, which process comprises oxidising a 3β-hydroxy or 3β-acyloxy-6,16-dimethylpregna-5,16-dien-20-one having the general formula

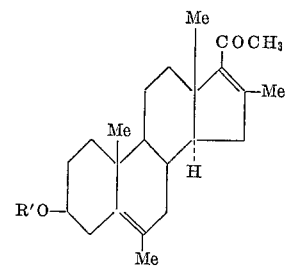

(II)

(wherein R' is hydrogen or a carboxylic acid residue containing up to 10 carbon atoms) to the corresponding 16α,17α-epoxide derivative having the general formula

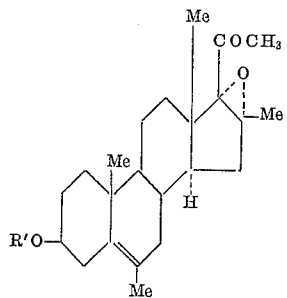

(III)

(where R' has the same meaning as above), acylating the 16α,17α-epoxide derivative in cases where R'=H, reacting the 16α,17α-epoxide derivative with a hydrogen halide or with sulphuric or perchloric acid in dioxan, to form a 3β-acyloxy-17α-hydroxy-6-methyl - 16-methylenepregn-5-en-20-one having the general formula

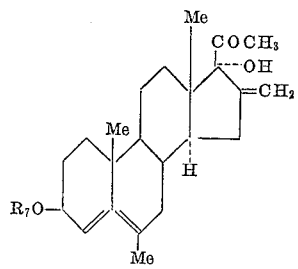

(IV)

(wherein R' is a carboxylic acid residue containing up to 10 carbon atoms), acylating the 17α-hydroxyl group to give a 3β,17α-diacyloxy-6-methyl-16-methylenepregn-5-en-20-one having the general formula

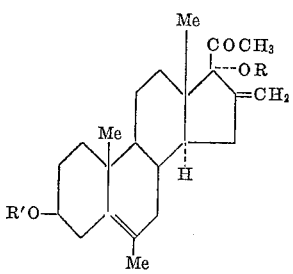

(V)

(wherein R' is a carboxylic acid residue containing up to 10 carbon atoms and R has the same meaning as above) preferentially hydrolysing the 3β-acyloxy group to give an acyloxy-hydroxyketone having the general formula

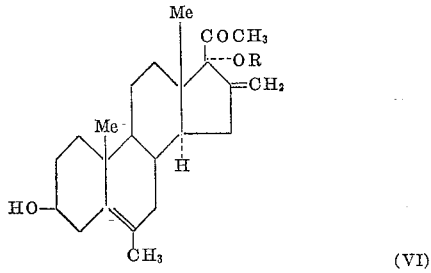

(VI)

(wherein R has the same meaning as above) and oxidising the 3β-hydroxyl group of the acyloxyhydroxy ketone with isomerisation of the 5,6-double bond to the conjugate 4,5 position.

In carrying out the process according to the present invention, it is preferable to employ 3β-acetoxy-6,16-dimethylpregna-5,16-dien-20-one (II; R'=Ac) as starting material, the preparation of which has been described in our co-pending application No. 824,961, now Patent No. 3,028,381. Oxidation of this material to the 16α, 17α-epoxide (III; R'=Ac) may be effected by treating compound II wherein R'=Ac, with tert.-butyl hydroperoxide in alkaline solution or preferably with hydrogen peroxide in an alcoholic solution made alkaline with a hydroxide such as sodium or potassium hydroxide. The reaction proceeds readily at 0° C., but may be accelerated by using temperatures up to the boiling point of the alcohol used as solvent. Complete saponification of the 3β-acetoxy group occurs during this reaction and the product is acetylated to give 3β-acetoxy-16α,17α-epoxy-6,16-dimethyl-pregn-5-en-20-one (III; R'=Ac).

The epoxy derivative (III; R'=Ac) so obtained is then treated in a solvent such as dioxan, acetic acid or benzene, with a hydrogen halide which is preferably hydrogen bromide at a temperature at or below 25° C. and preferably within the range 0° C. to 10° C. The product so obtained may contain residual halogen which may be removed, if desired, by treatment with Raney nickel in an organic solvent such as ethanol or acetone at or about room temperature to give 3β-acetoxy-17α-hydroxy-6-methyl-16-methylenepregn-5-en-20-one (IV; R'=Ac).

Alternatively, the epoxy derivative (III; R'=Ac) may be treated with sulphuric acid or perchloric acid in a solvent such as dioxan, preferably at or about room temperature to give the 16-methylene compound (IV; R'=Ac) directly. Acylation of the tertiary 17α-hydroxyl group present in the latter compound may be achieved by methods well-known to those skilled in the art. Such methods include, for example, treatment of the compound with an acid anhydride, such as acetic anhydride, or acid chloride and a catalytic quantity of toluene-p-sulphonic acid at a temperature of about 20° C. for 8 hour. Acylating agents that can be employed include the anhydrides and chlorides derived from the following acids, acetic, propionic, butyric, valeric, caproic, oenanthic, cyclopentyl-propionic, cyclohexanecarboxylic, benzoic, hexahydrobenzoic, toluic, β-phenylpropionic, nicotinic, furoic and thiophene carboxylic. Partial hydrolysis of the resulting 3β-acyloxy-17α-acyloxy-6-methyl-16-methylenepregn-5-en-20-one (V; R'=Ac, R=acyl) may be best effected with hot ethanolic or methanolic hydrochloric acid, when 17α-acyloxy-3β-hydroxy-6-methyl-16-methylenepregn-5-en-20-one (VI; R=acyl) is obtained. Conversion of this latter compound into the required 17α-acyloxy-6α-methyl-16-methylenepregn-4-ene-3,20-dione (I; R=acyl) may conveniently be achieved by an oxidation of the Oppenauer type, employing for example, toluene as solvent, cyclohexanone as hydrogen acceptor and an aluminium alkoxide such as aluminium tert.-butoxide or iso-propoxide in suitable proportions.

Following is a description by way of example of methods of carrying the invention into effect.

Example 1

3β-ACETOXY-6,16-DIMETHYL-16α,17α-EPOXYPREGN-5-EN-20-ONE (III; R'=Ac)

3β-acetoxy-6,16-dimethylpregn-5,16-dien-20-one (6.3 g.) dissolved in boiling ethanol (50 ml.) under reflux, was treated with 40% aqueous sodium hydroxide solution (3 ml.) followed by 30% hydrogen peroxide (8.5 ml.) and the mixture boiled for 30 minutes. The reaction mixture was cooled and the crystalline product collected, dried and acetylated with acetic anhydride/pyridine at 100° C. for 1 hour, and purified from methanol to give 3β-acetoxy-6,16-dimethyl-16α,17α-epoxypregn-5-en-20-one, needles, M.P. 118 to 120° C. $[\alpha]_D^{23}$ −49° (c., 0.654 in chloroform).

3β-ACETOXY-17α-HYDROXY-6-METHYL-16-METHYLENE-PREGN-5-EN-20-ONE (IV; R'=Ac)

3β-acetoxy-6,16-dimethyl-16α,17α-epoxypregn-5-en-20-one (8 g.) dissolved in dioxan (200 ml.), cooled in an ice/water bath, was treated with a 50% solution of hydrogen bromide in acetic acid (4 ml.) for 15 minutes. The dioxan was diluted with water and the product isolated with ether. The residue, after evaporation of the ether, was dissolved in acetone (200 ml.) and stirred vigorously with Raney nickel (20 g.) at room temperature, for 4 hours. The Raney nickel was filtered off and washed well with methylene chloride. The filtrate was evaporated to dryness and the residue crystallised from hexane to give 3β-acetoxy-17α-hydroxy-6-methyl-16-methylenepregn-5-ene-20-one needles M.P. 126 to 128° C., $[\alpha]_D^{24}$ −161° (c., 0.306 in chloroform).

In an alternative method 3β-acetoxy-6,16-dimethyl-16α,17α-epoxypregn-5-en-20-one (5 g.) dissolved in dioxan (200 ml.) containing concentrated sulphuric acid (0.5 ml.) was left overnight at room temperature (20° C.). The reaction mixture was poured into water and the precipitated solids were collected by filtration and washed with water and dried. Crystallisation of the solid from hexane gave 3β-acetoxy-17α-hydroxy-6-methyl-16-methylenepregn-5-en-20-one, M.P. 126 to 128° C.

3β,17α-DIACETOXY-6-METHYL-16-METHYLENEPREGN-5-EN-20-ONE (V; R=R'=Ac)

3β-acetoxy-17α-hydroxy-6-methyl-16-methylenepregn-5-en-20-one (IV; R'=Ac) (1 g.) and toluene-p-sulphonic acid monohydrate (150 mg.) were suspended in acetic anhydride (35 ml.) and left at room temperature overnight. The clear solution was poured into water, and the product isolated with ether. The residue from the ether extracts crystallised from hexane in plates to give 3β,17α-diacetoxy-6-methyl-16-methylenepregn-5-en-one, M.P. 166 to 168° C., $[\alpha]_D^{25}$ −178° (c., 0.882 in chloroform).

17α-ACETOXY-3β-HYDROXY-6-METHYL-16-METHYLENE-PREGN-5-EN-20-ONE (VI; R=Ac)

The foregoing diacetoxyketone (V; R=R'=Ac) (1 g.) was heated under reflux in methanol (100 ml.) containing concentrated hydrochloric acid (1 ml.) for 1 hour. The mixture was poured into water, and the precipitate collected and crystallised from aqueous methanol to give 17α-acetoxy-3β-hydroxy-6-methyl-16-methylenepregn-5-en-20-one, needles, M.P. 163 to 165° C., $[\alpha]_D^{25}$ −175° (c., 0.334 in chloroform).

17α-ACETOXY-6α-METHYL-16-METHYLENEPREGN-4-ENE-3,20-DIONE (I; R=Ac)

The foregoing acetoxyhydroxyketone (VI; R=Ac) (1 g.) in cyclohexanone (24 ml.) was heated under reflux with aluminium tert.-butoxide (1 g.) in dry toluene (16 ml.) for 1 hour. Rochelle salt solution was added to the mixture which was then steam distilled for 6 hours. The product was isolated with ether, and the residue from the ether extracts was crystallised from aqueous methanol to give 17α-acetoxy-6α-methyl-16-methylenepregn-4-ene-3,20-dione (I; R=Ac), needles, M.P. 206 to 208° C., $[\alpha]_D^{22}$ —99° (c., 0.214 in chloroform), $\lambda_{max.}^{EtOH}$ 240 m$\mu$, log $\epsilon$ 4.19

Example 2

3β-ACETOXY-17α-CAPROYLOXY-6-METHYL-16-METHYL-ENEPREGN-5-EN-20-ONE (V; R=CO.C₅H₁₁; R'=Ac)

3β - acetoxy - 17α - hydroxy - 6 - methyl - 16 - methylenepregn-5-en-20-one (IV; R'=Ac) (1 g.) and toluene-p-sulphonic anhydride monohydrate (150 mg.) were suspended in caproic anhydride (30 ml.) and the mixture left at room temperature for 4 days. Pyridine (10 ml.) was then added and the mixture steam-distilled until no more organic matter was present in the distillate, when the product was extracted from the residual liquor with ether, and was obtained as a gum after removal of the ether.

17α-CAPROYLOXY-3β-HYDROXY-6-METHYL-16-METHYL-ENEPREGN-5-EN-20-ONE (VI; R=CO.C₅H₁₁)

The foregoing crude product was heated under reflux with methanol (100 ml.) and concentrated hydrochloric acid (1 ml.) for 1 hour, poured into water and the product isolated with ether.

17α-CAPROYLOXY-6α-METHYL-16-METHYLENEPREGN-4-ENE-3,20-DIONE (I; R=CO.C₅H₁₁)

The foregoing crude product in cyclohexanone (20 ml.) and dry toluene (20 ml.) was heated under reflux with aluminium tert.-butoxide (1 g.) for 1 hour, then Rochelle salt (20 g.) was added and the mixture steam distilled for 6 hours. The product, isolated with ether was a gum which after chromatography on alumina (30 g.) afforded 17α - caproyloxy - 6α - methyl - 16 - methylenepregn-4-ene-3,20-dione as a low-melting solid.

We claim:
1. A process for the preparation of 17α-acyloxy-6α-methyl - 16 - methylenepregn - 4 - ene - 3,20 - diones having the general formula

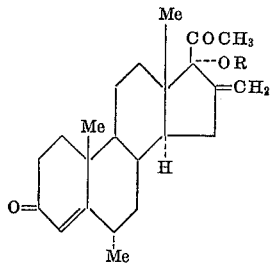

(I)

wherein R is a carboxylic acid residue containing up to 10 carbon atoms, which process comprises oxidising a steroid selected from the group consisting of a 3β-hydroxy and 3β - acyloxy - 6,16 - dimethylpregna - 5,16 - dien - 20-one having the general formula

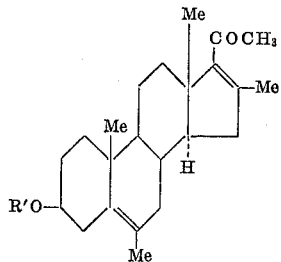

(II)

(wherein R' is a group selected from the class consisting of hydrogen and a carboxylic acid residue containing up to 10 carbon atoms) with alkaline hydrogen peroxide to form the corresponding 16α,17α-epoxide

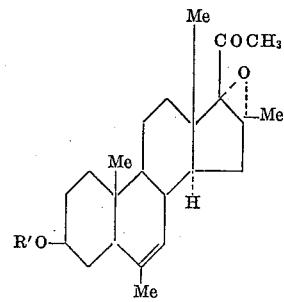

(III)

(where R' has the same meaning as above), acylating the 16α,17α-epoxide derivative in cases where R'=H by reaction with an acylating agent providing a residue of a hydrocarbon carboxylic acid containing up to 10 carbon atoms, reacting the 16α,17α-epoxide derivative with an acid selected from the group consisting of a hydrogen halide, sulphuric and perchloric acid to form a 3β-acyloxy - 17α - hydroxy - 6 - methyl - 16 - methylenepregn-5-en-20-one having the general formula

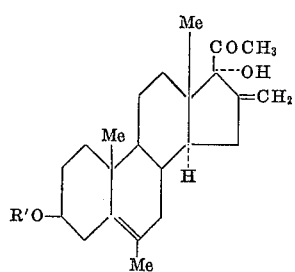

(IV)

(wherein R' is a carboxylic acid residue containing up to 10 carbon atoms), acylating the 17α-hydroxyl group by reaction with an acylating agent providing a residue of a hydrocarbon carboxylic acid containing up to 10 carbon atoms to give a 3β,17α-diacyloxy-6-methyl-16-methylenepregn-5-en-20-one having the general formula

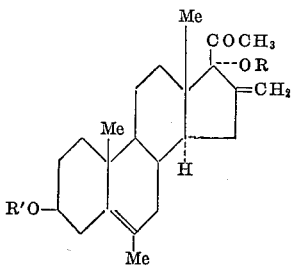

(V)

(wherein R' is a carboxylic acid residue containing up to 10 carbon atoms and R has the same meaning as above) preferentially hydrolysing the 3β-acyloxy group to give an acyloxyhydroxyketone having the general formula

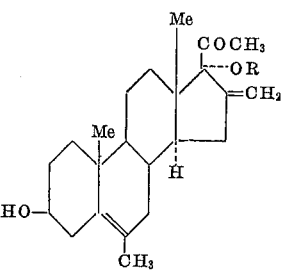

(VI)

(wherein R has the same meaning as above) and subjecting said acyloxyhydroxyketone to Oppenauer oxidation to oxidise the 3β-hydroxyl group with isomerisation of the 5,6-double bond to the conjugate 4,5 position thereby providing a compound having the Formula I above.

2. A process as claimed in claim 1 wherein 3β-acetoxy- 6,16-dimethylpregna-5,16-dien-20-one is oxidised with hydrogen peroxide in alkaline alcoholic solution.

3. A process as claimed in claim 1 wherein said 16α,17α-epoxide derivative is treated in a solvent with hydrogen bromide.

4. A process as claimed in claim 1 wherein the preferential hydrolysis of the 3β-acyloxy group is effected with hot methanolic hydrochloric acid.

5. A process as claimed in claim 1 wherein oxidation of the 3β-hydroxyl group of said acyloxydioxydione is effected by the use of an aluminium alkoxide in toluene in the presence of a hydrogen acceptor.

6. A process as claimed in claim 5 wherein said hydrogen acceptor is cyclohexanone.

References Cited in the file of this patent

UNITED STATES PATENTS

| | | |
|---|---|---|
| 2,876,237 | Julian et al. | Mar. 3, 1959 |
| 2,892,851 | Bergstrom et al. | June 30, 1959 |
| 2,954,386 | Beyler | Sept. 27, 1960 |

OTHER REFERENCES

Fieser and Fieser: Steroids (Reinhold, N.Y.), June 25, 1959, page 570.